United States Patent [19]

Liu

[11] Patent Number: 4,579,884

[45] Date of Patent: Apr. 1, 1986

[54] COPOLYETHERESTER MOLDING COMPOSITIONS

[75] Inventor: Nan-I Liu, Mt. Vernon, Ind.

[73] Assignee: General Electric Company, Pittsfield, Mass.

[21] Appl. No.: 691,031

[22] Filed: Jan. 11, 1985

[51] Int. Cl.$^4$ .................... C08K 9/00; C08K 3/34
[52] U.S. Cl. .................... 523/216; 524/444; 524/445; 524/447; 524/450; 524/539; 524/600; 524/601; 524/602; 525/444
[58] Field of Search ............ 524/444, 445, 447, 450, 524/539, 600, 601, 602; 525/444; 523/216

[56] References Cited

U.S. PATENT DOCUMENTS

| | | | |
|---|---|---|---|
| 3,651,014 | 3/1972 | Witsiepe | 260/75 R |
| 3,907,926 | 9/1975 | Brown et al. | 524/539 |
| 4,064,098 | 12/1977 | Saitoh et al. | 524/444 |
| 4,184,997 | 1/1980 | Wu | 260/40 R |
| 4,203,887 | 5/1980 | Goedde et al. | 524/445 |
| 4,211,689 | 7/1980 | Borman | 525/444 |
| 4,212,791 | 7/1980 | Avery et al. | 525/444 |
| 4,221,694 | 9/1980 | Salee | 524/601 |
| 4,256,860 | 3/1981 | Davis et al. | 525/437 |
| 4,315,882 | 2/1982 | Hiratsuka et al. | 264/171 |
| 4,322,333 | 3/1982 | Kochanowski et al. | 523/522 |
| 4,337,192 | 6/1982 | Campbell | 523/212 |
| 4,467,057 | 8/1984 | Dieck et al. | 524/447 |
| 4,469,851 | 9/1984 | Charles et al. | 525/444 |

FOREIGN PATENT DOCUMENTS

| 48059 | 4/1975 | Japan . |
|---|---|---|
| 1431916 | 4/1976 | United Kingdom . |

*Primary Examiner*—Herbert J. Lilling
*Attorney, Agent, or Firm*—Edward K. Welch, II; William F. Mufatti; John W. Harbour

[57] ABSTRACT

Copolyetherester molding compositions comprising a copolyetherester and modifying combination of (i) an aromatic thermoplastic polyester and (ii) clay.

20 Claims, No Drawings

COPOLYETHERESTER MOLDING COMPOSITIONS

The present invention relates to novel thermoplastic elastomeric molding compositions which are capable of withstanding high temperatures with little heat sag and which are able to absorb high energy impact and "springback" with little or no permanent deformation. Specifically, the compositions of the instant invention consist essentially of one or more copolyetheresters, in random or block form, and a property improving amount of a modifier combination consisting of (a) an aromatic thermoplastic polyester and (b) a mineral filler selected from the group consisting of clay and syenite.

BACKGROUND

Copolyetheresters are well known and have enjoyed continued and increasing commercial success. They are available from several sources including the Hytrel ® resins from E.I. duPont and the GAFLEX ® resins from GAF Corporation and are described in U.S. Pat. Nos. 3,023,192; 3,651,014; 3,763,109; 3,766,146; 3,784,520; 3,801,547; 4,156,774; 4,264,761 and 4,355,155, among others, all incorporated herein by reference. While these copolyetheresters have a number of desirable properties including excellent tear strength, flex life, toughness, and general elastomeric stress-strain characteristics, their use is limited by their low flexural modulus. Generally, depending upon their formulation, copolyetheresters suitable for molding applications vary from very soft elastomers to semirigid elastomers. However, many molding applications require that the molding compositions be rigid at least to the extent that molded parts therefrom are able to maintain their structural integrity and resist deformation upon low energy impact.

It is suggested in the foregoing references that the modulus of elasticity of copolyetheresters may be increased by incorporating therein various reinforcing fillers such as glass and mica. More recently, it has been alleged that the flexural modulus as well as other physical properties may be enhanced by blending with copolyetheresters one or more thermoplastic polyesters. For example, Brown et al (U.S. Pat. No. 3,907,926) have prepared copolyetherester compositions having alleged improved Young's modulus combined with good flexibility and low temperature impact strength by creating a uniform blend of poly(butylene terephthalate) and a copolyetherester. Additionally, Perry et al (UK No. 1,431,916) have prepared blends of a polyester, particularly poly(alkylene terephthalates), and a copolyetherester allegedly having improved impact strength, stiffness and processability. Finally, Charles et al (U.S. Pat. No. 4,469,851) have prepared blends of poly(butylene terephthalate) and a copolyetherester derived from butanediol, butenediol, dimethylterephthalate and poly(tetramethylene ether) glycol which allegedly have improved melt stability.

While the foregoing blends have improved stiffness as manifested by higher flexural modulus, they tend to be too brittle. Specifically, depending upon the amount of polyester in the blend, these compositions are unable to absorb high energy impact without breaking. As the amount of polyester in the blend is increased, the amount of energy the part is able to withstand before break decreases. Unmodified copolyetheresters, on the other hand, are able to withstand said impact without break and are able to withstand even higher energy impact before break finally occurs. However, while the total energy these compositions can withstand before break is high, because of their low flexural modulus, the amount of energy they can absorb before permanent deformation occurs is relatively low.

It is an object of the present invention to provide thermoplastic elastomeric molding compositions which are suitable for a broad range of end use applications having sufficient flexural modulus so as to provide molded parts with good physical integrity and stiffness.

It is also an object of the present invention to provide thermoplastic elastomeric molding compositions which are able to withstand high temperatures with little or no heat sag.

Finally, it is an object of the present invention to provide thermoplastic elastomeric molding compositions which are able to withstand high energy impact before break and/or permanent deformation.

It has now been found that thermoplastic elastomeric molding compositions may be prepared which overcome the foregoing deficiencies and have good overall physical characteristics including high stress-strain properties, good impact resistance and good moldability.

SUMMARY

In accordance with the present invention there are provided improved thermoplastic elastomeric compositions having good flexural modulus and, more importantly, excellent heat sag resistance and Dynatup properties as compared to unmodified copolyetheresters consisting essentially of:

(A) one or more thermoplastic elastomeric copolyetheresters and (B) from about 10 to about 60 percent by weight, based on the combined weight of (A)&(B), of a modifying combination of
  (i) an aromatic thermoplastic polyester and
  (ii) a mineral filler selected from the group consisting of clay and syenite;

wherein the aromatic thermoplastic polyester (i) and mineral filler (ii) are each present in an amount of from about 5 to about 50 percent by weight and from about 5 to about 25 percent by weight, respectively, based on the total weight of (A)&(B).

Preferred compositions are those wherein the modifying combination(B) comprises from about 30 to about 55 percent by weight of (A)&(B) and (i) and (ii) are each present in an amount of from about 20 to about 40 and from about 10 to about 20 percent by weight based on (A)&(B).

DETAILED DESCRIPTION OF THE INVENTION

Suitable thermoplastic copolyetheresters(A) include both random and block copolymers. In general these are prepared by conventional esterification/polycondensation processes from (a) one or more diols, (b) one or more dicarboxylic acids, (c) one or more long chain ether glycols, and, optionally,(d) one or more caprolactones or polycaprolactones.

Diols(a) which can be used in the preparation of the copolyetheresters include both saturated and unsaturated aliphatic and cycloaliphatic dihydroxy compounds as well as aromatic dihydroxy compounds. These diols are preferably of a low molecular weight, i.e. having a molecular weight of about 300 or less.

When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as, for example, ethylene oxide or ethylene carbonate for ethylene glycol.

Preferred saturated and unsaturated aliphatic and cycloaliphatic diols are those having from about 2 to 19 carbon atoms. Exemplary of these diols there may be given ethylene glycol; propanediol; butanediol; pentanediol; 2-methyl propanediol; 2,2-dimethyl propanediol; hexanediol; decanediol; 2-octyl undecanediol; 1,2-, 1,3- and 1,4- dihydroxy cyclohexane; 1,2-, 1,3- and 1,4- cyclohexane dimethanol; butenediol; hexenediol, etc. Especially preferred are 1,4-butanediol and mixtures thereof with hexanediol or butenediol.

Aromatic diols suitable for use in the preparation of the thermoplastic elastomers are generally those having from 6 to about 19 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl) propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole %, most preferably at least 80 mole %, based on the total diol content, be the same diol. As mentioned above, the preferred thermoplastic elastomers are those in which 1,4-butanediol is present in a predominant amount.

Dicarboxylic acids (b) which are suitable for use in the preparation of the copolyetheresters include aliphatic, cycloaliphatic, and/or aromatic dicarboxylic acids. These acids are preferably of a low molecular weight, i.e., having a molecular weight of less than about 350; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. Additionally, the dicarboxylic acids may contain any substituent group(s) or combinations which do not substantially interfere with the polymer formation and use of the polymer in the practice of this invention.

Aliphatic dicarboxylic acids, as the term is used herein, refers to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used are sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 4-cyclohexene-1,2- dicarboxylic acid, 2-ethylsuberic acid, tetramethylsuccinic acid, cyclopentane dicarboxylic acid, decahydro-1,5-naphthalene dicarboxylic acid, 4,4'-bicyclohexyl dicarboxylic acid, decahydro2,6-naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, oxybis(benzoic acid), ethylene1,2-bis-(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and halo and $C_1$–$C_{12}$ alkyl, alkoxy, and aryl ring substitution derivatives thereof. Hydroxy acids such as p($\beta$-hydroxyethoxy)benzoic acid can also be used provided an aromatic dicarboxylic acid is also present.

Preferred dicarboxylic acids for the preparation of the polyetherimide esters are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed, it is preferred that at least about 60 mole %, preferably at least about 80 mole %, based on 100 mole % of dicarboxylic acid (b) be of the same dicarboxylic acid or ester derivative thereof. As mentioned above, the preferred copolyetheresters are those in which dimethylterephthalate is the predominant dicarboxylic acid.

Suitable long chain ether glycols (c) which can be used in the preparation of the thermoplastic elastomers are preferably poly(oxyalkylene)glycols and copoly(oxyalkylene)glycols of molecular weight of from about 400 to 12000. Preferred poly(oxyalkylene) units are derived from long chain ether glycols of from about 900 to about 4000 molecular weight and having a carbon-to-oxygen ratio of from about 1.8 to about 4.3, exclusive of any side chains.

Representative of suitable poly(oxyalkylene)glycols there may be given poly(ethylene ether)glycol; poly(propylene ether)glycol; poly(tetramethylene ether)glycol; random or block copolymers of ethylene oxide and propylene oxide, including ethylene oxide end capped poly(propylene ether)glycol and predominately poly(ethylene ether) backbone, copoly(propylene ether-ethylene ether)glycol; and random or block copolymers of tetrahydrofuran with minor amounts of a second monomer such as ethylene oxide, propylene oxide, or methyltetrahydrofuran (used in proportions such that the carbon-to-oxygen ratio does not exceed about 4.3). Polyformal glycols prepared by reacting formaldehyde with diols such as 1,4-butanediol and 1,5-pentanediol are also useful. Especially preferred poly(oxyalkylene)glycols are poly(propylene ether)glycol, poly(tetramethylene ether)glycol and predominately poly(ethylene ether) backbone copoly(propylene ether-ethylene ether)glycol.

Optionally, these copolyetheresters may have incorporated therein one or more caprolactones or polycaprolactones. Such caprolactone modified copolyetheresters are disclosed in copending U.S. patent application Ser. No. 643,985 filed Aug. 24, 1984, herein incorporated by reference.

Caprolactones (d) suitable for use herein are widely available commercially, e.g., Union Carbinde Corporation and Aldrich Chemicals. While epsilon caprolactone is especially preferred, it is also possible to use substituted caprolactones wherein the epsilon caprolactone is substituted by a lower alkyl group such as a methyl or ethyl group at the alpha, beta, gamma, delta or epsilon positions. Additionally, it is possible to use polycaprolactone, including homopolymers and copolymers thereof with one or more components, as well as hydroxy terminated polycaprolactone, as block units in the novel copolyetheresters of the present invention. Suitable polycaprolactones and processes for their production are described in, for example, U.S. Pat. Nos. 3,761,511; 3,767,627, and 3,806,495 herein incorporated by reference.

In general, suitable copolyetherester elastomers (A) are those in which the weight percent of (c) long chain ether glycol component or the combined weight percent of (c) long chain ether glycol component and (d) caprolactone component in the copolyetherester is from about 5 to about 70 weight percent. Preferred composition are those wherein the weight percent of (c) or (c) and (d) is from about 10 to about 50 weight percent. Where both (c) long chain ether glycol and (d) caprolactone are present, each will comprise from about 2 to about 50 percent by weight, preferrably from about 5 to about 30 percent by weight, of the copolyetherester.

As described above, the copolyetheresters may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653 and 3,801,547, herein incorporated by reference. Additionally, these compositions may be prepared by such processes and other known processes to effect random copolymers, block copolymers or hybrids thereof wherein both random and block units are present. For example, it is possible that any two or more of the foregoing monomers/reactants may be prereacted prior to polymerization of the final copolyetheresters. Alternatively a two part synthesis may be employed where in two different diols and/or dicarboxylic acids are each prereacted in separated reactors to form two low molecular weight prepolymers which are then combined with the long chain ether glycol to form the final tri-block copolyetherester. Further exemplification of various copolyetheresters will be set forth below in the examples.

The foregoing thermoplastic elastomers (A) are modified in accordance with the teachings of the instant invention by admixing therewith a modifying amount of a combination (B) of (i) one or more thermoplastic aromatic polyesters derived from an aliphatic and/or cycloaliphatic diol and an aromatic dicarboxylic acid or its ester derivative and (ii) a mineral filler selected from the group consisting of clay and syenite.

While most any of the abovementioned aliphatic and/or cycloaliphatic diols and aromatic dicarboxylic acids or ester derivatives thereof may be used in the preparation of the thermoplastic aromatic polyester, preferred polyesters will and have repeating units of the following general formula:

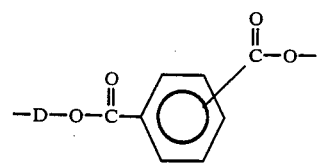

where D is the divalent radical remaining after removal of the hydroxy groups from a low molecular weight diol, as defined above. Additionally, these polyesters may also contain minor amounts of other units such as aliphatic dicarboxylic acids and/or aliphatic polyols. Preferred polyesters include poly(butylene terephthalate), poly(ethylene terephthalate) and blends thereof, most preferably poly(butylene terepthalate).

The polyesters described above are either commercially available or can be produced by methods well known in the art, such as those set forth in U.S. Pat. Nos. 2,465,319; 3,047,539 and 2,910,466, herein incorporated by reference.

Mineral fillers (b)(ii) suitable for use in the practice of the present invention are selected from the group consisting of clays and syenite.

The syenites are inorganic feldspathic minerals which are widely known and commercially available. A preferred syenite is the nepheline syenite which is an anhydrous sodium potassium aluminum silicate. One particular source for such mineral fillers is Indusmin Ltd. under the tradename MINEX.

The preferred class of mineral fillers are the clays. Clays are well known and widely available commercially. Preferred clays are the crystalline and paracrystalline clays. Especially preferred are the crystalline clays, most preferably the Kaolin clays. The clays, particularly the Kaolin clays, may be in the hydrous form or in the calcined, anhydrous form. Exemplary of commerically available, suitable clays there may be given the clays available under the tradenames Whitex and Translink from Freeport Kaolin.

Additionally, it is preferred, although not required, to utilize mineral fillers which have been treated with a titanate or silane coupling agent. Exemplary of such coupling agents there may be given vinyl tris 2-methoxy ethoxy silane and gamma-aminopropyl triethyoxy silane (A-1100, Union Carbide).

While most any amount of the modifying combination (B) of (i) aromatic thermoplastic polyester and (ii) mineral filler will increase the stiffness of the copolyetherester elastomer (A), in order to obtain compositions having the desirable combination of excellent heat sag resistance and Dynatup properties it is necessary that the composition comprise from about 10 to about 60 percent by weight of the combination (B) wherein the aromatic thermoplastic polyester, preferably a poly(alkylene terephthalate) (i) and mineral filler (ii) are each present in an amount of from about 5 to about 50 percent by weight and from about 5 to about 25 percent by weight, respectively, based on the total weight of (A)&(B). Preferred compositions are those wherein the combination (B) comprises from about 30 to about 55 percent by weight of (A)&(B) and wherein (i) and (ii) are each present in an amount of from about 20 to about 40 and from about 10 to about 20 percent by weight, respectively, based on (A)&(B). Finally, in order to obtain excellent flexibility and other elastomeric characteristics in the compositions of the present invention, it is preferred that the aromatic thermoplastic polyester (B)(i) is a poly(alkylene terephthalate)and that the amount employed not exceed the amount of copolyetherester elastomer(A).

While the compositions of this invention possess many desirable properties, it is sometimes advisable and preferred to further stabilize certain of the compositions against thermal or oxidative degradation as well as degradation due to ultraviolet light. This can be done by incorporating stabilizers into the blend compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxyethyl-s-triazine-2,4,6-(1H, 3H, 5H) trione; 4,4'-bis(2,6-ditertiary-butylphenyl); 1,3,5-trimethyl-2,4,6-tris-(3,5-ditertiary-butyl-4-hydroxylbenzyl)benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typically amine stabilizers include N,N'-bis(beta-naphthyl)-p-phenylenediamine; N,N'-bis(1-methylheptyl)-p-phenylenediamine and either phenyl-beta-napththyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones and/or benzotriazoles.

The compositions of the present invention may be prepared by any of the well known techniques for preparing polymer blends or admixtures, with extrusion blending being preferred. Suitable devices for the blending include single screw extruders, twin screw extruders, internal mixers such as the Bambury Mixer, heated rubber mills (electric or oil heat) or Farrell continuous mixers. Injection molding equipment can also be used to accomplish blending just prior to molding, but care must be taken to provide sufficient time and aggitation to insure uniform blending prior to molding.

Alternative methods include dry blending prior to extrusion or injection molding as well as precompounding of two ingredients, particularly the thermoplastic polyester (b)(i) and mineral filler (b)(ii) prior to mixing with the thermoplastic elastomer (a).

The polymer compositions prepared in accordance with the present invention are suitable for a broad range of molding applications. The preferred compositions have excellent heat sag resistance so as to allow for their use in painted articles which must be baked in ovens. Additionally, these compositions have excellent Dynatup properties such that when stuck, they "give" to the impinging energy and "spring back" after the energy is removed. Thus, these compositions are especially suitable for use in automotive applications, as for example, in fenders or bumpers.

DETAILED DESCRIPTION OF THE PREFERRED EMBODIMENTS

The following examples are presented as illustrative of the present invention and are not to be construed as limiting thereof.

The following copolyetheresters were used in exemplifying the present invention:

Polymer A

Polymer A is a random segmented copolyetherester derived from butanediol, dimethyl terephthalate and poly(tetramethylene ether)glycol (MW 1000) and is available from E.I. du Pont as Hytrel ® 5556.

Polymers B and C

Polymers B and C are random segmented copolyetheresters derived from butanediol, butenediol, dimethylterephthalate, and poly(tetramethylene ether) glycol(MW 1000) and are available from GAF Corporation as GAFLEX ® 547 and 555, the former having a higher weight percent of the ether glycol.

Polymer D

Polymer D is a random copolyetherester, derived from 25 parts butanediol, 48 parts dimethylterephthalate, 14 parts hexanediol and 13 parts poly(tetramethylene ether)glycol(MW 2000).

Polymer E

Polymer E is a block copolyetherester derived from about 35 parts by weight of poly(hexamethylene terephthalate) and from about 65 parts by weight of a polyetherester derived from butanediol, dimethylterephthalate and poly(tetramethylene ether)glycol(MW1000).

Polymers F and G

Polymers F and G are random copolyetheresters derived from 22 parts butanediol, 12 parts hexanediol, 42 parts dimethylterephthalate and 24 parts poly(tetramethylene ether)glycol(MW 1000 and 2000), respectively.

Polymer H

Polymer H is a random copolyetherester derived from 33 parts ethylene glycol, 45 parts dimethylterephthalate, and 22 parts poly(tetramethylene ether)glycol(MW 1000).

Polymer I

Polymer I is a random copolyetherester derived from 20 parts butanediol, 38 parts dimethylterephthalate,14 parts poly(tetramethylene ether)glycol and 18 parts epsilon-caprolactone.

Polymer J

Polymer J is a triblock block copolymer derived from 60 parts poly(butylene terephthalate) prepolymer, 30 parts poly(tetramethylene ether)glycol (MW 1000) and 15 parts of poly(hexamethylene hexahydrophthalate) prepolymer.

Polymer K

Polymer K is a triblock block copolymer derived from 60 parts poly(butylene terephthalate) prepolymer, 35 parts poly(tetramethylene ether) glycol(MW1000) and 15 parts poly(tetramethylene terephthalate) prepolymer.

Polymer L

Polymer L is a triblock copolymer derived from 60 parts by weight poly(butylene terephthalate) prepolymer, 30 parts by weight poly(tetramethylene ether)glycol(MW 2000) and 15 parts by weight poly(hexamethylene hexahydrophthalate) prepolymer.

Polymer M

Polymer M is a block copolymer derived from 32 parts butanediol, 41 parts dimethyl terephthalate, 23 parts poly(tetramethylene ether)glycol(MW 1000) and 4 parts of polyester prepolymer derived from hexanediol and $C_{36}$ dimer acid.

Polymer N

Polymer N is a block copolymer derived from 28 parts butanediol, 36 parts dimethyl terephthalate, 31.5 parts poly(tetramethylene ether)glycol(MW 1000) and 4.5 parts of a polyester prepolymer derived from hexanediol and $C_{36}$ dimer acid.

Polymer O

Polymer O is a block copolymer derived from 32 parts butanediol, 41 parts dimethyl terephthalate, 23 parts poly(tetramethylene ether)glycol(MW 1000) and 4 parts of a polyester prepolymer derived from a 2-octyl undecanediol and $C_{36}$ dimer acid.

All compositions were prepared by melt blending on a single screw Prodex extruder. Physical properties of these compositions were determined according to ASTM methods as follows:

| | |
|---|---|
| Notched Izod | ASTM D256 |
| Unnotched Izod | ASTM D256 |
| Flexural Modulus | ASTM D790 |

TABLE 1

| | A | B | 1 |
|---|---|---|---|
| Polymer C | 100 | 60 | 50 |
| PBT 295[a] | — | 40 | 35 |
| clay | — | — | 15 |
| Gardner Impact @ RT, in. lb | 480+ | 325 | 350 |
| Heat sag @ 290° F. 30 min, mm | 48 | 25 | 20 |

[a]poly(butylene terephthalate) - VALOX ® 295 resin from General Electric Company.

The results shown in Table 1 indicate that while Gardner impact of copolyetheresters is excellent, its heat sag resistance is poor. Although the addition to the copolyetherester of poly(butylene terephthalate) increases heat sag resistance, it has a dramatic detrimental effect on Gardner impact. As seen by Example 1 in Table 1, the incorporation of both poly(butylene terephthalate) and clay in the amounts prescribed by the present invention provides compositions having both good Gardner impact and excellent heat sag resistance.

EXAMPLES 2–8, COMPARATIVE EXAMPLES C–F

A series of examples were prepared demonstrating various combinations of copolyetherester, poly(butylene terephthalate) and clay. Also prepared were a series of comparative examples so as to more clearly demonstrate the benefit of the present invention. The specific formulations of the compositions and the resultant physical properties thereof were as presented in Table 2.

From Table 2 it is clear that the compositions of the present invention have greatly improved heat sag resistance over unmodified and clay modified copolyetherester. Additionally, these compositions have greatly improved Dynatup and flexibility over clay modified poly(butylene terephthalate). Finally, these compositions have improved impact strength as well as improved heat sag and Dynatup as compared to copolyetherester-poly(butylene terephthalate) blends.

TABLE 2

| | C | D | E | F | 2 | 3 | 4 | 5 | 6 | 7 | 8 |
|---|---|---|---|---|---|---|---|---|---|---|---|
| Polymer B | 99.8 | 84.8 | — | 57.9 | 48.9 | 48.9 | 48.9 | 48.9 | 48.6 | 38.6 | 45 |
| PBT 295[a] | — | — | 84.8 | 41.0 | 35 | — | — | — | 35 | 35 | 40 |
| PBT 315[b] | — | — | — | — | — | 35 | 40 | 30 | — | — | — |
| Clay[c] | — | 15 | 15 | — | 15 | 15 | 10 | 20 | 15 | 25 | 15 |
| Stabilizer | 0.2 | 0.2 | 0.2 | 1.1 | 1.1 | 1.1 | 1.1 | 1.1 | 1.4 | 1.4 | 1.1 |
| ¼" Notched Izod ft. lb./in. | NB | NB | 1.1 | 4.5 | 5.3 | 7.7 (1NB) | 10 (3NB) | 7.0 (1NB) | 4.0 | 2.9 | 3.6 |
| ¼" Unnotched Izod −30° C., ft. lb./in. | NB | NB | 14 | NB | NB | NB | NB | NB | NB | 36.4 (3NB) | NB |
| Flexural Modulus psi × $10^3$ | 16.6 | — | — | — | 120 | 112.3 | 120.2 | 112.3 | 110.2 | 148.2 | 140 |
| Heat Sage @ 290° F. 30 min., mm | 85 | 74 | 7 | 30 | 29 | 40 | 38 | 35 | 30 | 22 | 28 |
| Dynatup, −30° C. $E_{Max}/E_{Total}$ | 20/30 | 23/32 | 3/3 | 23/26 | 26/39 | 26/35 | 28/38 | 15/17 | 31/47 | 22/22 | 24/32 |

[a]Poly(butylene terephthalate) sold as VALOX ® 295 resin by General Electric Company.
[b]Poly(butylene terephthalate) sold as VALOX ® 315 resin by General Electric Company
[c]Surface treated calcined clay sold by Freeport Kaolin under the tradename Translink.

EXAMPLE 1, COMPARATIVE EXAMPLES A–B

A series of compositions were prepared illustrating the present invention and its benefit over unmodified and poly(butylene terephthalate) modified copolyetheresters. The specific compositions and the physical properties thereof were as shown in Table 1.

EXAMPLES 9–23, COMPARATIVE EXAMPLE G

An additional series of examples were prepared further demonstrating the breadth of the present invention. All examples comprised about 48.9 parts by weight of coplyetherester A–O, as indicated, 35 parts by weight of poly(butylene terephthalate), 15 parts by weight of Translink clay and about 1.1 parts by weight of stabilizers. The specific compositions and the physical properties thereof were as set forth in Table 3. Comparative Example G contains no clay.

From Table 3 it is clear that the benefit of the present invention is broadly applicable to copolyetheresters as a class. While there is some variation in properties depending upon the particular copolyetherester, in general, all compositions demonstrate an excellent and most useful combination of physical properties including heat sag, impact strength and Dynatup.

TABLE 3

|  | 9 | 10 | 11 | 12 | 13 | 14 | 15 | 16 |
|---|---|---|---|---|---|---|---|---|
| Polymer | A | B | D | E | F | F | G | H |
| PBT$^a$ | 315 | 295 | 295 | 315 | 295 | 315 | 295 | 315 |
| ¼" Notched Izod ft. lb./in. | NB | 4.4 | 4.1 | 4.3 | 8.3 (3NB) | 16.4 (1NB) | NB | 3.9 |
| ¼" Unnotched Izod −30° F. ft. lb./in. | NB | NB | 34 | NB | NB | NB | NB | NB |
| Heat Sag @290° F. mm | 56 | 33 | 48 | 28 | 68 | — | 29* | 31 |
| Dynatup, −30° C. $^E$Max/$^E$Total ft. lb. | 25/44 | 28/40 | 24/33 | 27/41 | 23/33 | 31/52 | 24/37 | 25/30 |

|  | 17 | 18 | 19 | 20 | 21 | 22 | 23 | G |
|---|---|---|---|---|---|---|---|---|
| Polymer | I | J | K | L | M | N | O | O |
| PBT$^a$ | 295 | 315 | 295 | 315 | 315 | 315 | 315 | 315 |
| ¼" Notched Izod ft. lb./in. | NB | 6.5 | 4.5 | 6.1 | 3.5 | 2.6 | 3.1 | 4.0 |
| ¼" Unnotched Izod −30° F. ft. lb./in. | NB | NB | NB | NB | NB | NB | 31.6 (1NB) | 7.9 |
| Heat Sag @290° F. mm | 26 | 45 | 33 | 33 | 27 | 27 | 22 | 30 |
| Dynatup, −30° C. $^E$Max/$^E$Total ft. lb. | 29/41 | 25/38 | 26/35 | 28/40 | 25/34 | 19/26 | — | — |

$^a$Poly(butylene terephthalate) available from General Electric Company as VALOX ® 295 and 315 resins.
*Heat sag at 250° F., 30 min.

EXAMPLES 24–28

A series of compositions were prepared demonstrating the applicability of the present invention to compositions prepared with a caprolactone modified copolyetherester. All compositions comprised about 49 parts by weight of copolyetherester, 35 parts by weight of poly(butylene terephthalate), 15 parts by weight of Translink clay and about 1 part by weight stabilizer. The specific makeup of the caprolactone modified copolyetherester (based on monomer charge, final polymer will be slightly different inasmuch as excess diols are used) and the physical properties of the compositions prepared therewith are shown in Table 4.

Comparison of Examples 24 and 25 shows that the use of poly(tetramethylene ether) glycol (Polymeg) of MW2000 versus MW1000 results in some loss of heat sag resistance, but improved Dynatup. Variance in the amount of poly(tetramethylene ether)glycol and caprolactone has only a minor effect on properties. Specifically, it appears that as poly(tetramethylene ether) content is decreased and caprolactone content concurrently increased both heat sag resistance and Dynatup properties increase while only a minor decrease is noted in low temperature unnotched izod. Finally, it is apparent from Example 28 that viscosity build of the copolyetherester has little affect on the properties except for low temperature impact.

TABLE 4

|  | 24 | 25 | 26 | 27 | 28 |
|---|---|---|---|---|---|
| Butanediol | 31 | 30 | 29 | 20 | 29 |
| Dimethyl-terephthalate | 39 | 38 | 38 | 38 | 37 |
| Polymeg 1000 | 20 | — | — | — | — |
| Polymeg 2000 | — | 19 | 18 | 16 | 18 |
| Caprolactone | 10 | 13 | 15 | 16 | 16 |
| Melt Viscosity of Polymer$^a$ | 5500 | 5400 | 4900 | 5400 | 2300 |
| PBT$^b$ | 315 | 315 | 295 | 295 | 295 |
| ¼" Notched Izod ft. lb./in. | NB | NB | NB | NB | NB |
| ¼" Unnotched Izod −30° C., ft. lb./in. | NB | NB | NB | 39(2NB) | 15(3NB) |
| Heat Sag @ 290° F. 30 min., mm | 32 | 38 | 34 | 26 | 30 |
| Dynatup, −30° C. ft. lb. | 23/32 | 25/38 | 27/41 | 27/41 | 27/40 |

$^a$Melt viscosity of the virgin copolyetherester.
$^b$VALOX ® 295 and 315 poly(butylene terephthalate) resins, as indicated, from General Electric Company.

EXAMPLES 29–33

A final series of compositions were prepared demonstrating the various mineral fillers that may be employed in the practice of the present invention. The compositional makeup and physical properties thereof were as shown in Table 5.

TABLE 5

|  | 29 | 30 | 31 | 32 | 33 |
|---|---|---|---|---|---|
| Polymer B | 48.9 | 48.9 | 48.9 | 48.9 | 48.9 |
| PBT 295$^a$ | 35 | 35 | 35 | 35 | 35 |
| Translink | 15 | — | — | — | — |
| Whitex 2$^c$ | — | 15 | — | — | — |
| Whitex 3$^d$ | — | — | 15 | — | — |
| Whitex 4$^e$ | — | — | — | 15 | — |
| Minex$^f$ | — | — | — | — | 15 |
| Stabilizer | 1.1 | 1.1 | 1.1 | 1.1 | 1.1 |
| ¼" Notched Izod, | 5.4 | 3.9 | 4.1 | 4.3 | 3.5 |
| ¼" Unnotched Izod, −30° C. ft. lbs./in. | NB | NB | NB | NB | NB |
| Flexural Modulus, psi | 99K | 110K | 123K | 116K | 101K |
| Tensile Strength, psi | 3,140 | 3,310 | 3,350 | 3,310 | 3,070 |
| Heat Sag, @ 290° F., 30 min., mm | 32 | 30 | 30 | 32 | 34 |

TABLE 5-continued

| | 29 | 30 | 31 | 32 | 33 |
|---|---|---|---|---|---|
| Dynatup, −30° C. | 24/34 | 15/19 | 22/28 | 25/37 | 13/33 |

[a]Poly(butylene terephthalate) - VALOX ® 295 General Electric Company
[b]Gamma aminopropyl triethoxysilane surface treated clay available from Freeport Kaolin.
[c,d & e]Kaolin clay available from Freeport Kaolin and subsequently treated with 2,3 and 4 weight percent of Union Carbide Y9872 organosilane coupling agent.
[f]Nepheline syenite available from Indusmin Ltd.

Obviously, other modifications will suggest themselves to these skilled in the art in light of the above, detailed description. All such modifications are within the full intended scope of the present invention as defined by the appended claims.

I claim:

1. A thermoplastic molding composition consisting essentially of:
(A) one or more copolyetherester elastomers derived from:
  (a) one or more diols
  (b) one or more dicarboxylic acids or the ester derivatives thereof,
  (c) one or more long chain ether glycols having a molecular weight of from about 400 to about 12000, and
  (d) optionally, one or more caprolactones, wherein the long chain ether glycol and caprolactone, if any, comprise from about 5 to about 70 weight percent of the copolyetherester, and
(B) from about 10 to about 60 percent by weight, based on the combined weight of (A)&(B), of a modifying combination of
  (i) an aromatic thermoplastic polyester having repeating units of the following formula:

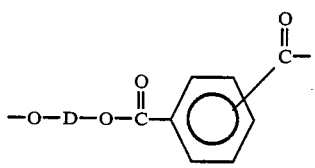

wherein D is the divalent radical remaining after removal of the terminal hydroxy groups of a $C_2$ to $C_{19}$ aliphatic or cycloaliphatic diol, and
  (ii) a mineral filler selected from the group consisting of clays and syenite, wherein (i) and (ii) are each present in an amount of from about 5 to about 50 percent by weight and from about 5 to about 25 percent by weight, respectively, based on the combined weight of (A)&(B).

2. The composition of claim 1 wherein the modifying combination (B) comprises from about 30 to about 55 percent by weight of (A)&(B) and the poly(alkylene terephthalate) (B)(i) and mineral filler (B)(ii) are each present in an amount of from about 20 to about 40 percent by weight and from about 10 to about 20 percent by weight, respectively, based on (A)&(B).

3. The composition of claim 1 wherein the copolyetherester elastomer is derived from
(a) one or more $C_2$ to $C_{19}$ aliphatic or cycloaliphatic diols,
(b) one or more $C_4$ to $C_{36}$ dicarboxylic acids,
(c) one or more poly(alkylene ether)glycols having a molecular weight of from about 900 to about 4000, and
(d) optionally, one or more caprolactones, wherein
  (i) at least 60 mole percent of the diols are the same
  (ii) at least 60 mole percent of the dicarboxylic acids are the same, and
  (iii) the combined amount of long chain ether glycol and caprolactone, if any, in the copolyetherester is from about 10 to about 50 weight present.

4. The composition of claim 3 wherein at least about 80 mole percent of the diols and at least about 80 mole percent of the dicarboxylic acids are the same.

5. The composition of claim 3 wherein the predominant dicarboxylic acid is dimethylterephthalate.

6. The composition of claim 4 wherein the predominant dicarboxylic acid is dimethylterephthalate.

7. The composition of claim 3 wherein the dicarboxylic acid is selected from the group consisting of hexahydrophthalic anhydride, $C_{36}$ dimer acid and dimethylterephthalate.

8. The composition of claim 3 wherein the poly(alkylene ether)glycol is selected from the group consisting of poly(ethylene ether)glycol, poly(propylene ether)glycol, poly(tetramethylene ether)glycol and copoly(propylene ether-ethylene ether)glycol.

9. The composition of claim 3 wherein the poly(alkylene ether)glycol is poly(tetramethylene ether)glycol.

10. The composition of claim 1 wherein the copolyetherester contains a caprolactone in an amount of from about 2 to about 50 percent by weight.

11. The composition of claim 1 wherein the copolyetherester contains a caprolactone in an amount of from about 10 to about 30 percent by weight.

12. The composition of claim 10 wherein the caprolactone is epsilon caprolactone.

13. The composition of claim 11 wherein the caprolactone is epsilon caprolactone.

14. The composition of claim 1 wherein the aromatic thermoplastic polyester is represented by repeating units of the following formula:

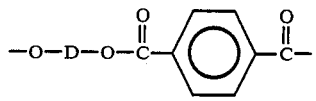

wherein D is the divalent radical remaining after removal of the terminal hydroxy groups of a $C_2$ to $C_6$ aliphatic diol.

15. The composition of claim 1 wherein the aromatic thermoplastic polyester is selected from the group consisting of poly(ethylene terephthalate), poly(butylene terephthalate), copoly(butylene terephthalate-isophthalate) and blends thereof.

16. The composition of claim 1 wherein the aromatic thermoplastic polyester is poly(butylene terephthalate).

17. The composition of claim 1 wherein the mineral filler is clay.

18. The composition of claim 17 wherein the clay is calcined, Kaolin clay.

19. The composition of claim 17 wherein the clay is treated with a coupling or sizing agent.

20. The composition of claim 18 wherein the clay is treated with a coupling or sizing agent.

* * * * *